Patented Jan. 28, 1941

2,229,995

UNITED STATES PATENT OFFICE 2,229,995

PROCESS FOR REMOVING ACID COMPO-
NENTS FROM HYDROCARBON DISTIL-
LATES

David Louis Yabroff, Berkeley, and Ellis R. White,
Albany, Calif., assignors to Shell Development
Company, San Francisco, Calif., a corporation
of Delaware No Drawing. Application May 5, 1939,
Serial No. 271,962

14 Claims. (Cl. 196—30)

This invention deals with the removal of weakly acid reacting organic substances from solutions in certain water-insoluble organic liquids by extraction with aqueous solutions of caustic alkali containing a solubility promoter for these substances, and more particularly deals with the removal of mercaptans from hydrocarbon distillates.

It is frequently necessary to eliminate small quantities of organic relatively weak acid reacting components, such as mercaptans, phenols, thiophenols, alkyl phenols, fatty acids, etc., from their solutions in neutral or weakly basic reacting organic liquids which are substantially immiscible with water such as the liquid hydrocarbons derived from petroleum, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chlorpropane, chlorbutylene, chlorbenzene, brombenzene, are examples; or nitrogen containing hydrocarbons such as amyl or higher amines, aniline, water-insoluble pyridine derivatives, petroleum bases, etc.

In order that the water-insoluble organic liquids may be treated by our process, they must be substantially inert and resistant to chemical reaction with strong aqueous solutions of caustic alkali when contacted therewith for short periods of time, e. g., about 10 minutes or less at normal room temperatures.

Our invention comprises extracting organic acids which are difficult to extract, such as the weak acids having dissociation constants below about $10^{-5}$, e. g., mercaptans, phenols, etc., contained in water-insoluble organic liquids which are substantially inert toward strong aqueous caustic alkali solutions at normal room temperatures, with an aqueous solution of caustic alkali in which is dissolved a substantial amount of a solubility promoter or solutizer for weak organic acids, under conditions to absorb at least a major portion of the weak organic acids in the aqueous solution, and to form two layers, and separating the layers.

We have found that solutizers to be suitable must possess a number of properties such as solubility in the aqueous caustic alkali, insolubility in the organic water-immiscible liquid containing the weak organic acid, high solvent power for the weak organic acid to be extracted, chemical inertness toward the caustic alkali even at the elevated temperatures of steam stripping, and, if possible, boiling temperatures substantially above that of water. Among the compounds which may be used as solutizers, we have found that certain salts of organic dicarboxylic acids are particularly useful. These are the water-soluble salts of non-aromatic (i. e., aliphatic and alicyclic) dicarboxylic acids having from 5 to 11 carbon atoms, in which the carboxyl radicals are separated by at least 2 carbon atoms.

The alkali metal salts of the above dicarboxylic acids are preferred, because they are the most soluble in aqueous caustic alkali solution. We have further found that of the above acids, those having an uneven number of carbon atoms are in general better solutizers than those having even numbers, salts of the former being usually more soluble in water than corresponding salts of the latter. Thus the acids of our invention may have the formula

in which $n$ is a numeral from 3 to 9. Isomers of these acids having an equal number of carbon atoms may, however, be equally useful. For example, they may have the formula

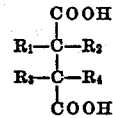

in which at least one of the radicals $R_1$ to $R_4$ is a hydrocarbon radical, the others being hydrogen or hydrocarbon radicals. Acids of this type may be prepared, for example, by causing maleic acid anhydride and certain hydrocarbons capable of reacting with the olefinic double bond of the maleic acid anhydride, to react with each other, under conditions to form a condensation product, and hydrolyzing the latter. For instance, monoolefines and maleic acid anhydride will combine, according to Eichwald U. S. Patent No. 2,055,456, when heated together. The acids so produced are believed to be alkylene succinic acids, and may be used as solutizers even though they contain an olefinic double bond. To make these acids fully resistant to polymerization, the olefinic double bond may be eliminated as by hydrogenation.

Still other types of suitable dicarboxylic acids may be prepared by reduction of phthalic acid or its homologues to the corresponding alicyclic dicarboxylic acids. Mixture of suitable alicyclic acids may also be prepared by treating highly cracked low boiling distillate containing diolefines, such as methyl butadiene with maleic acid anhydride under conditions to cause the Diehls and Alder reaction to proceed, separating unreacted gasoline from the reaction product, hydrolyzing and, if desired, hydrogenating the latter. Thus an acid obtained according to the above might have the formula

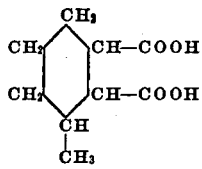

The phthalic acids are not suitable as solutizers, their salts, including the alkali metal salts, being comparatively little soluble in aqueous solutions of caustic alkalis, such as alkali metal hydroxides.

Malonic acid derivatives should be avoided because they decompose readily under liberation of $CO_2$.

In the table below, the K values are shown for n-amyl mercaptan between isoöctane and potassium hydroxide containing the potassium salts of several of the dicarboxylic acids of this invention, K being the partition coefficient of the mercaptan between the aqueous and the oil phases $$K = \frac{\text{concentration of the mercaptan in the aqueous phase}}{\text{concentration of the mercaptan in the oil phase}}$$

| Salt | Free KOH normality | G. l. salt radical in saturated solution | Kq n-amyl mercaptan |
|---|---|---|---|
| Glutarate, $COOK(CH_2)_3COOK$ | 4 | 355 | 3.62 |
| Do | 6 | 272 | 10.35 |
| Adipate, $COOK(CH_2)_4COOK$ | 4 | 219 | 4.12 |
| Pimelate, $COOK(CH_2)_5COOK$ | 4 | 354 | 26.1 |
| Suberate, $COOK(CH_2)_6COOK$ | 4 | 198 | 4.88 |
| Azelâate, $COOK(CH_2)_7COOK$ | 4 | 291 | 30.2 |
| Azelâate | 6 | 117 | 24.8 |
| Sebacate, $COOK(CH_2)_8COOK$ | 4 | 49.5 | 2.91 |
| Undecane dicarboxylate $COOK(CH_2)_9COOK$ | 4 | 225 | 18.10 |

Aqueous solutions of various caustic alkalis may be used. The alkali metal hydroxides are most useful and effective, although ammonia, quaternary ammonium bases, alkali metal carbonates, etc., may also be suitable.

The concentration of the aqueous caustic alkali may vary within wide limits. In general, we prefer to use caustic alkali solutions, the free caustic alkali content of which is above about 2 normal, and preferably between 3 to 8 normal calculated on the total solution, although higher and lower concentrations may be used.

The concentration of the dicarboxylic acid salts should be as high as possible, because the solvent promoting effect increases with the concentration of the promoter. On the other hand, saturated solutions present the danger of causing precipitation of solids and of plugging the extraction equipment. For this reason, it is usually better to operate at a concentration somewhat below saturation, e. g., at concentrations between about 30% to 95% saturated, and preferably 50% to 90% saturated.

The temperature of the extraction is preferably kept between 0° and 60° C., the extraction efficiency decreasing with rising temperature; and at temperatures below about 0° C. difficulties are frequently encountered due to precipitation of a portion of the salts and/or excessive viscosity of the caustic alkali containing the salts.

The extraction of the organic acids from their solutions in the organic liquids described before may be carried out by simply mixing the solution with a pre-determined amount of the aqueous caustic alkali solution in which is dissolved a soluble dicarboxylic acid salt in an amount between the limits described before, and then separating the liquids. The resulting aqueous solution contains the salt and usually a major portion of the organic acids, while the treated organic liquid is substantially freed from the acids. More thorough extraction may be had, however, in a multi-stage countercurrent extraction system, or in a packed tower.

The amount of aqueous caustic alkali solution containing the solubility promoting salt required in the extraction is normally above about 5% by volume, and for economic reasons seldom exceeds about 100% by volume. Normally from about 10% to about 50% by volume is used, depending upon the required thoroughness of removing the weak organic acids.

Spent aqueous alkali solutions containing the soluble carboxylic acid salts and absorbed weak organic acids may be regenerated by distillation, steaming, and/or oxidation according to well-known principles.

We claim as our invention:

1. In the process of separating weak organic acids contained in a water insoluble neutral or basic organic liquid, the steps comprising treating said liquid with an aqueous solution of a strong base being 30 to 95% saturated with an alkali metal salt of a dicarboxylic acid selected from the group consisting of aliphatic and alicyclic dicarboxylic acids having from 5 to 11 carbon atoms in which the carboxyl radicals are separated by at least two carbon atoms, under conditions to absorb at least a portion of said acid-reacting substances in said aqueous solution and to form two liquid layers, one comprising the aqueous solution containing absorbed acid, and the other consisting essentially of the treated organic liquid, and separating the layers.

2. The process of claim 1 in which the carboxylic acid has an uneven number of carbon atoms.

3. The process of claim 1 in which the carboxylic radical contains not more than one olefinic double bond.

4. The process of claim 1 in which the aqueous base solution is between 50% and 90% saturated with the dicarboxylic acid salt.

5. The process of claim 1 in which the aqueous base solution is a caustic alkali solution in which the content of free caustic alkali is between 2–8 normal.

6. The process of claim 1 in which the base is an alkali metal hydroxide.

7. The process of claim 1 in which the base is potassium hydroxide and the salt is the potassium salt of the dicarboxylic acid.

8. In the process of separating mercaptans contained in a hydrocarbon oil, the steps comprising treating said oil with an aqueous solution of an alkali metal hydroxide being 30 to 95% saturated with an alkali metal salt of a dicarboxylic acid selected from the group consisting of aliphatic and alicyclic dicarboxylic acids having from 5 to 11 carbon atoms in which the carboxyl radicals are separated by at least two carbon atoms, under conditions to absorb at least a portion of said mercaptans in said aqueous solution and to form two liquid layers, one comprising the aqueous solution containing absorbed mercaptides, and the other consisting essentially of the treated hydrocarbon oil.

9. In the process of separating mercaptans contained in a hydrocarbon oil, the steps comprising treating said oil with an aqueous solution of potassium hydroxide being 30% to 95% saturated with a potassium salt of a dicarboxylic acid selected from the group consisting of aliphatic and alicyclic dicarboxylic acids having from 5 to 11 carbon atoms in which the carboxyl radicals are separated by at least two carbon atoms, under conditions to absorb at least a portion of said mercaptans in said aqueous solution and to form two liquid layers, one comprising the aqueous solution containing absorbed mercaptides, and the other consisting essentially of the treated hydrocarbon oil.

10. In the process of separating organic weakly acid-reacting substances contained in a hydrocarbon oil, the steps comprising treating said oil with an aqueous solution of potassium hydroxide being at least 30% saturated with potassium azeläate, under conditions to absorb at least a portion of said acid-reacting substances in said aqueous solution and to form two liquid layers, one comprising the aqueous solution containing absorbed acid-reacting substances, and the other consisting essentially of the treated hydrocarbon oil.

11. In the process of separating weakly acid-reacting organic substances contained in a hydrocarbon oil, the steps comprising treating said oil with an aqueous solution of an alkali metal hydroxide being 30 to 95% saturated with alkali metal salts of a dicarboxylic acid selected from the group consisting of aliphatic and alicyclic dicarboxylic acids having from 5 to 11 carbon atoms, said acid having been prepared by a reaction involving condensation of maleic acid anhydride and a hydrocarbon capable of reacting with the olefinic double bond of said maleic acid anhydride, under conditions to absorb at least a portion of said acid-reacting substances in said aqueous solution and to form two liquid layers, one comprising the aqueous solution containing absorbed acid-reacting substances, and the other consisting essentially of the treated hydrocarbon oil.

12. The process of claim 11 in which the dicarboxylic acid is derived from a condensation product of maleic acid anhydride and an olefine.

13. In the process of separating organic weakly acid-reacting substances contained in a hydrocarbon oil, the steps comprising treating said oil with an aqueous solution of an alkali metal hydroxide being 30 to 95% saturated with an alkali metal salt of an acid having the formula

in which $n$ is a numeral from 3 to 9, under conditions to absorb at least a portion of said acid-reacting substances in said aqueous solution and to form two liquid layers, one comprising the aqueous solution containing absorbed acid-reacting substances, and the other consisting essentially of the treated hydrocarbon oil.

14. In the process of separating weakly acid-reacting organic substances contained in a hydrocarbon oil, the steps comprising treating said oil with an aqueous solution of an alkali metal hydroxide being 30 to 95% saturated with an alkali metal salt of an acid having the formula

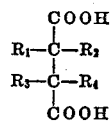

in which at least one of the radicals $R_1$ to $R_4$ is a hydrocarbon radical, the others being selected from the group consisting of hydrogen and hydrocarbon radicals, under conditions to absorb at least a portion of said acid-reacting substances in said aqueous solution and to form two liquid layers, one comprising the aqueous solution containing absorbed acid-reacting substances, and the other consisting essentially of the treated hydrocarbon oil.

DAVID LOUIS YABROFF.
ELLIS R. WHITE.